Dec. 24, 1968     J. E. FULOP     3,417,501
GUIDE FOR A FISHING LINE
Filed Jan. 25, 1966
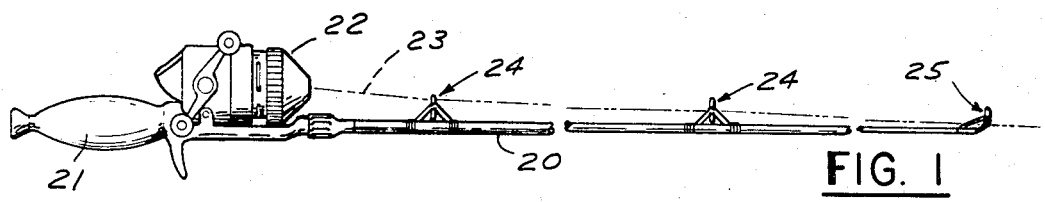
FIG. 1
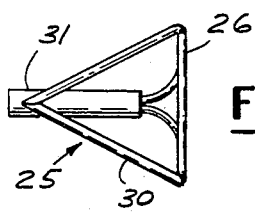
FIG. 4
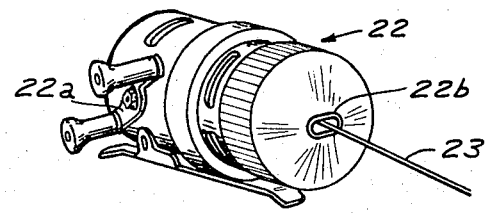
FIG. 2
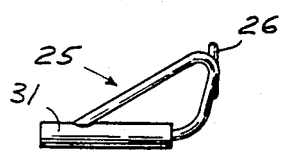
FIG. 5
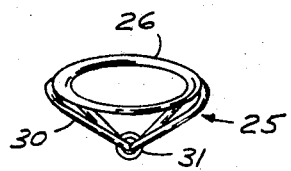
FIG. 3
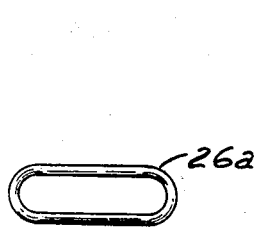
FIG. 8
FIG. 9
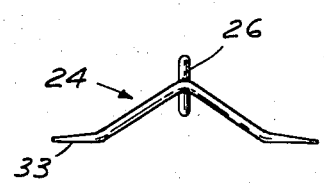
FIG. 7
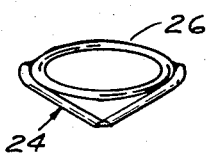
FIG. 6
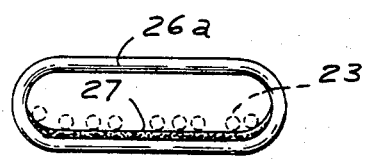
FIG. 10
INVENTOR
JULES E. FULOP
BY Hane and Nydick
ATTORNEYS United States Patent Office 3,417,501
Patented Dec. 24, 1968

3,417,501
GUIDE FOR A FISHING LINE
Jules E. Fulop, Milwaukee, Wis., assignor to Allan
Manufacturing Company, Hicksville, N.Y.
Filed Jan. 25, 1966, Ser. No. 529,600
3 Claims. (Cl. 43—24)

ABSTRACT OF THE DISCLOSURE

A line guide for a fishing line in which the line guiding opening of the guide member has a generally oval outline and is so oriented that the long axis of the opening is crosswise of the lengthwise axis of the fishing rod when the line guide is attached to the same. Such an oval shaped guide member has the advantage that its effective area is several hundred percent larger than that of conventional circular guide members and as a result it will outlast the conventional guides and markedly reduce line fraying and cutting.

---

The present invention relates to a line guide, and more particularly to a fishing line guide for attachment to a fishing rod and also for incorporation in a fishing reel.

As is well known to anyone familiar with fishing equipment of the general kind here involved, a fishing line will slide through its guides often at a considerable speed when being paid out or reeled in. It may also be quite taut while moving through the guide. As a result, the line engages the bearing surface of the guide with considerable frictional pressure, particularly when the line leaves the guide at an angle to its direction of movement, as is often the case at the tip guide of the rod.

It is common practice to provide a hard and polished bearing surface in the guide, either by making the same out of a material which can be given a hard and smooth bearing surface, or by lining the guide with a suitable material, such as hardened steel or a polished stone, for instance, quartz.

It has been found that the aforementioned conventional means for providing a low friction bearing surface in a fishing line guide is not fully satisfactory, at least not for a prolonged period of service. Line guides as heretofore known generally have a circular guide opening formed by a ring member. Similarly, reels as heretofore known generally have a circular opening for passage of the line in either direction. As a result, the bearing surface area upon which the line pressure and friction act is bound to be very limited. Observation shows that in actual use it is not more than a narrow strip in the inner periphery of the guide ring. Such narrow bearing surface tends to lose its initial smoothness after a comparatively short period of use, the more so as abrasive materials, such as sand, tend to adhere to the line and/or the guide, and also due to the corrosive action of water, especially when the fishing equipment is used for salt water fishing.

It is a broad object of the invention to provide a novel and improved fishing line guide, the bearing surface of which retains its initial low friction properties for a considerably longer period than do line guides as heretofore known.

A more specific object of the invention is to provide a novel and improved fishing line guide the bearing surface of which is elongated transversely of the fishing rod. As a result, the wearing action of the line will be distributed upon a much wider bearing surface than was heretofore available for the line, as the same will automatically slide sidewise on such elongated bearing surface when and while passing through the guide opening in either direction.

Another more specific object of the invention is to provide a novel and improved line guide, the guiding opening of which has a substantially rectangular or oval peripheral outline to form said elongated bearing surface.

Still another more specific object of the invention is to provide a novel and improved fishing line guide which can be simply and inexpensively manufactured, and the mounting of which on the fishing rod can be effected in the same manner as a conventional line guide is mounted and by using the same type of fastening means.

It is also an object of the invention to provide a novel and improved reel of the general kind above referred to, the guide opening of which has an elongated peripheral outline permitting a sidewise movement of the line on the elongated bearing surface of the opening, thereby reducing the wear on the bearing surface of the reel and on the line.

Other and further objects, features and advantages will be pointed out hereinafter and set forth in the appended claims constituting parts of the application.

In the accompanying drawing several preferred embodiments of the invention are shown by way of illustration, and not by way of limitation.

In the drawing:

FIG. 1 is a side view of a conventional casting rod equipped with several line guides according to the invention and also with a reel according to the invention;

FIG. 2 is a perspective view of the reel on an enlarged scale;

FIG. 3 is a front view of a line guide according to the invention designed for the tip of the rod;

FIG. 4 is a plan view of FIG. 3;

FIG. 5 is a side view of FIG. 3 or FIG. 4;

FIG. 6 is a front view of a line guide according to the invention for mounting on an intermediate part of the fishing rod;

FIG. 7 is a side view of FIG. 6;

FIG. 8 is a top view of FIG. 6 or FIG. 7;

FIG. 9 is a front view of a modification of the guide member of the line guide; and FIG. 10 is a front view of a further modification of the guide member of the line guide.

Referring first to FIG. 1 in detail, this figure shows a conventional fishing rod 20, such as a casting rod, equipped with a handle 21 and supporting a fishing reel 22. A fishing line 23 may be paid out from the fishing reel or wound up within the same by means of a handle 22a in a conventional manner. The rod mounts several intermediate line guides 24 and a guide 25 for the tip of the rod.

The reel 22 as shown in FIGS. 1 and 2 should be visualized as being generally conventional except for the configuration of the guide opening. The circular opening generally used as a line-guiding opening is replaced by an elongated opening 22b to permit lateral movement of the line within the opening. The opening is shown as being substantially rectangular, but an elliptical or oval peripheral outline may also be used. It should be noted in this connection that the invention is not limited to the exemplified type of reel, but is applicable to any type of reel including a line-guiding opening.

Turning now to FIGS. 3, 4 and 5, these figures show a guide member 26 having a generally elliptical or oval inner peripheral outline. The flattened guide ring thus formed may be visualized as being made of any material suitable and known for the purpose, and it may also be visualized as having a suitably polished inner surface. Guide ring 26 is suitably and fixedly secured by brackets or braces 30 to a tubular mounting member 31 which fits upon the tip of rod 20, as is shown in FIG. 1.

As is evident, the line, when tensioned due to being paid out or reeled in, will bear primarily against the lower half of the bearing surface of the guide member 26, as seen in FIG. 3. As is also evident, the bearing surface thus available for the line is a much wider one than is provided by a circular guide opening of a comparable diameter. In a circular guide opening the line when under tension will primarily move along the axial bottom strip of the inner peripheral outline of the guide ring, whereas with an elongated guide ring according to the invention the line will automatically tend to ride sidewise along the bearing surface, the more so as the correspondingly elongated reel opening 22b facilitates such sidewise movements of the line.

FIGS. 6, 7 and 8 show a similar arrangement for the line guides 24. The guide member 26 proper again has a bearing surface with a generally oval or elliptical peripheral outline, the guiding function of which is the same as has been explained in connection with the tip guide 25. The guide member 26 of FIGS. 6 through 8 is secured to the fishing rod by a mounting brace or bracket 32 terminating in flanges 33, which may be secured to rod 20 by tying or binding in a conventional manner, as is indicated in FIG. 1.

FIG. 9 shows a guide member 26a with a line-guiding opening of substantially rectangular peripheral outline. The guide member of FIG. 9 may be used either as part of a tip guide or as part of an intermediate guide. As is apparent from the previous description, the elongated and substantially straight base part of the guide member provides a wide bearing surface for a fishing line.

Finally, FIG. 10 shows a guide member 26a the lower half of which is lined with a suitable bearing surface 27, such as a surface made of hardened steel or polished quartz. The lateral movements of fishing line 23 along the lined bearing surface 27 and the corresponding distribution of the wearing action upon a wide surface are indicated in FIG. 10.

What is claimed is:

1. A reel for a fishing line attachable to a fishing rod, said reel comprising a guide wall including a guiding opening of elliptical and continuously rounded peripheral outline, the long axis of said opening extending crosswise of the lengthwise axis of a fishing rod to which the reel is attached and straddling the rod.

2. A line guide for a fishing line, said line guide comprising in combination:
    a guide member having a line-guiding opening elliptical and continuously rounded peripheral outline; and
    mounting means for mounting said guide member on a fishing rod, said mounting means including fastening elements for fixedly securing the guide member on and wholly to one side of the fishing rod in a position in which the short axis of said line guiding opening is disposed normal to the lengthwise axis of the fishing rod and the long axis of the opening is disposed crosswise of said lengthwise axis of the rod straddling the same.

3. A line guide according to claim 2, wherein one of said fastening elements is a tubular element fitting the tip of a fishing rod.

References Cited

UNITED STATES PATENTS

| | | | |
|---|---|---|---|
| 1,869,441 | 8/1932 | Shakespeare. | |
| 2,740,221 | 4/1956 | Kono | 43—24 |
| 2,333,632 | 11/1943 | Benson | 43—20 |
| 1,605,710 | 11/1926 | Ford | 43—20 |
| 1,073,260 | 9/1913 | Long | 43—18 |

FOREIGN PATENTS 7,459   8/1908   Great Britain.

SAMUEL KOREN, *Primary Examiner.*

D. J. LEACH, *Assistant Examiner.*

U.S. Cl. X.R.

242—841